US006706350B2

(12) United States Patent
Sato et al.

(10) Patent No.: US 6,706,350 B2
(45) Date of Patent: Mar. 16, 2004

(54) CORROSION-RESISTANT PIPE AND METHOD FOR THE PREPARATION THEREOF

(75) Inventors: Sho Sato, Utsunomiya (JP); Yoshinori Amaya, Moka (JP)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 10/186,046

(22) Filed: Jun. 28, 2002

(65) Prior Publication Data

US 2003/0049402 A1 Mar. 13, 2003

(30) Foreign Application Priority Data

Jul. 2, 2001 (JP) .......................... 2001-201172

(51) Int. Cl.⁷ .................. B32B 1/08; B32B 15/08; B29D 23/00; F16L 9/147; F16L 9/18
(52) U.S. Cl. .................. 428/36.9; 428/36.91; 428/35.8; 428/461; 428/462; 138/137; 138/140; 138/145
(58) Field of Search .................. 428/36.91, 36.9, 428/35.8, 461, 462; 138/137, 140, 145

(56) References Cited

U.S. PATENT DOCUMENTS

| | | |
|---|---|---|
| 4,239,673 A | 12/1980 | Lee, Jr. |
| 4,242,263 A | 12/1980 | Lee, Jr. |
| 4,299,757 A | 11/1981 | Kuribayashi et al. |
| 4,383,082 A | 5/1983 | Lee, Jr. |
| 4,460,743 A | 7/1984 | Abe et al. |
| 4,480,057 A | 10/1984 | Sano .......................... 523/206 |
| 4,713,416 A | 12/1987 | Del Giudice et al. |
| 4,764,559 A | 8/1988 | Yamauchi et al. |
| 4,772,657 A | 9/1988 | Akiyama et al. |
| 4,863,997 A | 9/1989 | Shibuya et al. |
| 4,892,904 A | 1/1990 | Ting |
| 4,962,148 A | 10/1990 | Orikasa et al. |
| 4,985,495 A | 1/1991 | Nishio et al. |
| 4,990,558 A | 2/1991 | DeNicola, Jr. et al. |
| 4,994,508 A | 2/1991 | Shiraki et al. |
| 5,061,753 A | 10/1991 | Maruyama et al. |
| 5,071,911 A | 12/1991 | Furuta et al. |
| 5,071,912 A | 12/1991 | Furuta et al. |
| 5,075,376 A | 12/1991 | Furuta et al. |
| 5,079,295 A | 1/1992 | Furuta et al. |
| 5,081,187 A | 1/1992 | Maruyama et al. |
| 5,106,696 A | 4/1992 | Chundury et al. |
| 5,132,363 A | 7/1992 | Furuta et al. |
| 5,149,740 A | 9/1992 | Maruyama et al. |
| 5,159,004 A | 10/1992 | Furuta et al. |
| 5,162,433 A | 11/1992 | Nishio et al. |
| 5,162,435 A | 11/1992 | Shibuya et al. |
| 5,162,440 A | 11/1992 | Akkapeddi et al. |
| 5,166,264 A | 11/1992 | Lee, Jr. et al. |
| 5,182,151 A | 1/1993 | Furuta et al. |
| 5,191,024 A | 3/1993 | Shibata et al. |
| 5,206,281 A | 4/1993 | Furuta |
| 5,268,425 A | 12/1993 | Furuta et al. |
| 5,286,791 A | 2/1994 | DeNicola, Jr. et al. |
| 5,290,856 A | 3/1994 | Okamoto et al. |
| 5,296,540 A | 3/1994 | Akiyama et al. |
| 5,304,593 A | 4/1994 | Nishio et al. |
| 5,370,813 A | 12/1994 | DeNicola, Jr. et al. |
| 5,397,822 A | 3/1995 | Lee, Jr. |
| 5,405,902 A | 4/1995 | Nishio et al. |
| 5,418,287 A | 5/1995 | Tanaka et al. |
| 5,424,360 A | 6/1995 | Nagaoka et al. |
| 5,461,111 A | 10/1995 | Modic et al. |
| 5,473,015 A | 12/1995 | DeNicola, Jr. et al. |
| 5,494,962 A | 2/1996 | Gauthy et al. |
| 5,648,424 A | 7/1997 | Miwa et al. |
| 5,705,556 A | 1/1998 | Djiauw et al. |
| 6,005,050 A | 12/1999 | Okada et al. |
| 6,045,883 A | 4/2000 | Akiyama et al. |
| 6,258,881 B1 | 7/2001 | Moritomi |
| 6,349,747 B1 * | 2/2002 | Camberlin et al. .......... 138/141 |
| 6,509,412 B1 | 1/2003 | Hall ............................ 525/92 |
| 2002/0023845 A1 | 2/2002 | Ding et al. .................. 205/164 |

FOREIGN PATENT DOCUMENTS

| | | |
|---|---|---|
| EP | 0 326 895 A2 | 1/1989 |
| EP | 0 412 787 A3 | 8/1990 |
| EP | 0 765 914 A1 | 5/1995 |
| EP | 1 029 876 | 9/1999 |
| GB | 1 559 262 | 12/1977 |
| WO | WO 90/05759 | 5/1990 |
| WO | WO 91/05016 | 4/1991 |

OTHER PUBLICATIONS

Machine Translation of JP 08–238717, Sep. 17, 1996.*
U.S. patent application Ser. No. 09/682,919, Adedeji et al., filed Nov. 1, 2001.
U.S. patent application Ser. No. 09/682,920, Adedeji et al., filed Nov. 1, 2001.
U.S. patent application Ser. No. 09/682,921, Adedeji et al., filed Nov. 1, 2001.
U.S. patent application Ser. No. 09/682,923, Adedeji et al., filed Nov. 1, 2001.
U.S. patent application Ser. No. 09/682,926, Adedeji et al., filed Nov. 1, 2001.
U.S. patent application Ser. No. 09/682,628, Adedeji et al., filed Nov. 1, 2001.
U.S. patent application Ser. No. 09/682,929, Adedeji et al., filed Nov. 1, 2001.
U.S. patent application Ser. No. 09/683,766, Adedeji et al., filed Feb. 12, 2002.

(List continued on next page.)

*Primary Examiner*—Harold Pyon
*Assistant Examiner*—Christopher Bruenjes

(57) ABSTRACT

A corrosion-resistant pipe is formed by covering a surface of a pipe with a resin composition that contains (A) 1 to 98 parts by weight of a polyphenylene ether resin; (B) 1 to 98 parts by weight of a polystyrene resin; (C) 1 to 98 parts by weight of a polyolefin resin; wherein the total of (A), (B), and (C) is 100 parts by weight; and (D) 0.1 to 100 parts by weight of a compatibility reagent per 100 parts by weight total of (A), (B), and (C).

15 Claims, No Drawings

OTHER PUBLICATIONS

U.S. patent application Ser. No. 10/063,336, Adedeji et al., filed Apr. 12, 2002.

Tuftec ® H1043 Technical Bulletin, Dec. 16, 1999, ASAHI Chemical Industry Co., Ltd., pp. 1–5.

Tuftec®P–Series High Performance Thermoplastic Elastomer, pp. 1–2 <http: www.asahi–kasei.co.jp/plastic/e/technical/br/p–series.htm©.

M. K. Akkapeddi and B. VanBuskirk, Adv. Polym. Technol. (1992), vol. 11, No. 4, pp 263–275.

G.–X. Wei, H.–J. Sue, J. Chu, C. Huang, K. Gong, "Morphology and Mechanical Property of Poly(phenylene oxide) Modified Polyphenylene Blends", ANTEC '99, vol. III, New York City, 2nd–6th May 1999, pp. 3443–3447.

Derwent Abstract for JP 01098647.
Chemical Abstracts Record for JP 03181555.
Chemical Abstracts Record for JP 03185058.
Chemical Abstracts Record for JP 03231962.
Derwent Abstract for JP 03259941.
Derwent Abstract for JP 04007357.
Derwent Abstract for JP 04028739.
Derwent Abstract for JP 04028740.
Chemical Abstracts Record for JP 04183748.
Derwent Abstract for JP 04279697.
Derwent Abstract for JP 04293942.
Derwent Abstract for JP 05070679.
Derwent Abstract for JP 05295184.
Derwent Abstract for JP 06009828.
Derwent Abstract for JP 06016924.
Derwent Abstract for JP 06057130.
Derwent Abstract for JP 06136202.
Derwent Abstract for JP 07003083.
Chemical Abstracts Record for JP 07165998.
Chemical Abstracts Record for JP 07166026.
Derwent Abstract for JP 07304908.
Derwent Abstract for JP 08238717.
Derwent Abstract for JP 09316322.
Derwent Abstract for JP 11060836.
Derwent Abstract for JP 52094519.
Derwent Abstract for JP 58093730.
Derwent Abstract for JP 63113047.
Derwent Abstract for JP 63113049.
Derwent Abstract for JP 63113050.
Derwent Abstract for JP 2000143891.
International Search Report Dated Oct. 28, 2002.
JP 06057008. Publication Date of Jan. 3, 1994. Abstract Only. 1 page.
JP 03130765. Publication Date of Apr. 6, 1991. Abstract Only 1 page.

* cited by examiner

CORROSION-RESISTANT PIPE AND METHOD FOR THE PREPARATION THEREOF

BACKGROUND

The present invention relates to a pipe having its surface covered with a resin protective layer. In particular, the present invention relates to a pipe part material that can be used in any environment such as underground, indoors, or outdoors, has extremely wide application scope, and is appropriate for use as pipes for transportation of gas, petroleum materials, water, etc.

Steel pipes having a corrosion-proof protective layer in which the outer surface of the steel pipe has been covered with a comparatively thick thermoplastic resin film or cover, etc., in order to protect the steel pipe from corrosion have been widely used as pipelines for petroleum (crude oil), city gas supplying pipes, plant pipes, tap water or hot spring water supplying pipes, etc. Also, steel articles other than pipes, such as steel pipe pickets, steel plates, shaped steel, bar steel, etc., have utilized surface coverings of corrosion-proof resin.

As the thermoplastic resin used in the protective layer of these steel materials, polyolefins such as polyethylene, polypropylene, etc., have mainly been used, however, poly(vinyl chloride) resin, different polyamide resins, different fluorinated resins, different saturated polyester resins, etc., have also been used depending on the usage environment and required properties.

For example, a steel pipe having its surface covered with polyolefin resin as well as a pipe coupling has been presented in Japanese Patent Publication No. Sho 52-94519.

However, there existed good and bad points for each of these different thermoplastic resins, and a material having corrosion-proof characteristics that could protect the steel pipe under all types of environment could not be necessarily obtained. For example, the polyolefin variety that is used in most of the cases for a corrosion-proof covering of the steel material has excellent chemical resistance but low heat resistance, poor weatherability, and high combustibility. Also, its adhesion to steel is poor, and as a result a complicated manufacturing process is required in which a modified polyolefin adhesive layer is applied over a coating of epoxy primer.

Also, the poly(vinyl chloride) resin has excellent flame retardance but low stability, and hydrochloric acid is gradually released. Moreover, polyamide and saturated polyester resins have high moisture absorption and thus possess low electric resistance in underground environments, particularly underground in damp soil. There therefore exists a possibility of the main material getting electrically corroded. Fluorinated resin has excellent corrosion resistance, flame retardance, stability, and electrical resistance, but it is extremely expensive and moreover has poor adhesion to steel, which detracts from its corrosion-proofing properties. Furthermore, since it has a high melting point, it requires a high temperature of more than 400° C. for its adhesion.

The formation of a protective layer from polyphenylene ether resin has also been proposed. For example, Japanese Patent Publication No. Hei 8-238717 describes a steel pipe possessing a covering formed from a polyphenylene ether resin composition containing (1) 100 parts by weight of a resin component formed from polyphenylene ether resin (A) contained in a quantity of 10 to 100% by weight and styrene polymer (B) contained in a quantity of 90 to 0% by weight, (2) 0 to 50 parts by weight of a rubber component formed from styrene rubber polymer, and (3) 0 to 40 parts by weight of a flame retardant.

However, the polyphenylene ether resin described in the Japanese Patent Publication No. Hei 8-238717 has low chemical resistance compared to that of polyolefin resin, so excellent corrosion-proofing could not be obtained even by forming a protective layer. Also, use of the polyphenylene ether resin or its composition was associated with problems such as poor adhesion, a complicated manufacturing process, etc.

BRIEF SUMMARY

The present invention aims at offering a resin-covered pipe that has high heat resistance and excellent flame retardance, corrosion-resistance, chemical resistance, insulation properties, and sufficiently high adhesion to steel, as well as low cost.

One embodiment is a corrosion-resistant pipe, comprising:
  a pipe; and
  a protective layer covering a surface of the pipe, the protective layer comprising
    (A) 1 to 98 parts by weight of a polyphenylene ether resin,
    (B) 1 to 98 parts by weight of a polystyrene resin,
    (C) 1 to 98 parts by weight of a polyolefin resin,
    wherein the total of (A), (B), and (C) is 100 parts by weight; and
    (D) 0.1 to 100 parts by weight of a compatibility reagent per 100 parts by weight total of (A), (B), and (C).

Another embodiment is a corrosion-resistant pipe, comprising:
  a pipe; and
  a protective layer covering a surface of the pipe, the protective layer comprising
    (A) 1 to 98 parts by weight of a polyphenylene ether,
    (B) 1 to 98 parts by weight of a polystyrene resin,
    (C) 1 to 98 parts by weight of a polyolefin resin,
    wherein the total of (A), (B), and (C) is 100 parts by weight;
    (D) 0.1 to 100 parts by weight of a compatibility reagent (D) per 100 parts by weight total of (A), (B), and (C), and
    (E) 0 to 100 parts by weight of an impact modifier per 100 parts by weight total of (A), (B), and (C).

The quantity of polystyrene resin (B) present in the resin composition mentioned above is preferably more than 10% by weight with respect to the total of polyphenylene ether resin (A) and polystyrene resin (B).

Also, the compatibility reagent (D) is preferably a hydrogenated styrene.diene block copolymer, which preferably has a styrene content more than 60% by weight.

In the present invention, the protective layer is preferably a film formed from the resin composition or an injection molded product of the resin composition.

DETAILED DESCRIPTION OF THE PREFERRED EMBODIMENTS

A detailed explanation of the corrosion-resistant pipe of the present invention is given below.

The surface of the corrosion-resistant pipe of the present invention is covered with the resin composition containing polyphenylene ether resin (A), polystyrene resin (B), polyolefin resin (C), and compatibility reagent (D).

Polyphenylene ether resin (A)

There is no particular restriction on the material that can be used as polyphenylene ether resin (PPE resin) and well-known materials can be used. Suitable PPE resins include polymers having structural units shown by the general formula (I) below

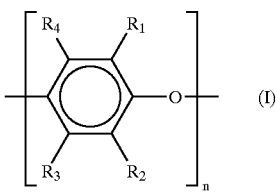

[Formula 1]

wherein each of $R_1$, $R_2$, $R_3$, and $R_4$ is hydrogen atom, halogen atom, hydrocarbon radical, substituted hydrocarbon radical, alkoxy radical, cyano radical, phenoxy radical, or nitro radical; and n is an integer showing the degree of polymerization.

The polyphenylene ether resin used in the present invention can be in form of a homopolymer formed from one type of structural units shown by the general formula given above or can be in the form of a copolymer having two or more than two types combined.

Concrete examples of $R_1$, $R_2$, $R_3$, and $R_4$, include radicals such as chlorine, bromine, iodine, methyl, ethyl, propyl, allyl, phenyl, benzyl, methyl benzyl, chloro benzyl, bromomethyl, cyanoethyl, cyano, methoxy, ethoxy, phenoxy, nitro, etc.

Concrete examples of the polyphenylene ether resin include poly (2,6-dimethyl-1,4-phenylene ether), poly (2,6-diethyl-1,4-phenylene ether), poly (2-methyl-6-ethyl-1,4-phenylene ether), poly (2-methyl-6-propyl-1,4-phenylene ether), poly (2,6-dipropyl-1,4-phenylene ether), poly (2-ethyl-6-propyl-1,4-phenylene ether), poly (2,6-dimethoxy-1,4-phenylene ether), poly (2,6-dichloro methyl-1,4-phenylene ether), poly (2,6-dibromo methyl-1,4-phenylene ether), poly (2,6-diphenyl-1,4-phenylene ether), poly (2,6-di toluyl-1,4-phenylene ether), poly (2,6-dichloro-1,4-phenylene ether), poly (2,6-dibenzyl-1,4-phenylene ether), poly (2,5-dimethyl-1,4-phenylene ether), etc.

An especially preferred PPE resin is the polymer having alkyl radicals, particularly, alkyl radicals having 1 to 4 carbon atoms, as the $R_1$ and $R_2$ occurring in the formula (I) given above, and n is preferably more than 50. Preferred PPE resins further include copolymers comprising units in which the polyphenylene ether structural units given above are trialkyl-substituted, such as copolymers comprising 2,3,6-trimethyl-1,4-phenylene ether units. Also, the copolymer in which styrene compound has been grafted onto the PPE can be used. As regards the styrene compound used for grafting, styrene, alpha-methyl styrene, vinyl toluene, chloro styrene, etc. can be used.

Polystyrene resin (B)

The polystyrene resin itself is well known and is a material comprising at least 25% by weight of the structural units shown by the general formula (II) given below

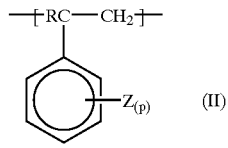

[Formula 2]

wherein R is a hydrogen atom or an alkyl radical having 1 to 4 carbon atoms, Z is a halogen atom or an alkyl radical having 1 to 4 carbon atoms, and p is an integer from 0 to 5.

Polystyrene resins include homopolymers of styrene or its derivatives, as well as copolymers with p-methyl styrene, alpha-methyl styrene, alpha-methyl-p-methyl styrene, chlorostyrene, bromostyrene, etc. Polystyrene copolymers may further include copolymers of the above homopolymers and copolymers with polybutadiene, polyisoprene, butyl rubber, EPDM, ethylene-propylene copolymer, natural rubber, mixtures of natural such as epichlorohydrin or synthetic elastomer material or styrene polymer modified by it. Polystyrene copolymers further include copolymers containing styrene, such as styrene-acrylonitrile copolymer (SAN), styrene-butadiene copolymer, styrene-maleic anhydride copolymer, and styrene-acrylonitrile-butadiene copolymer (ABS). The preferred styrene polymers for the present invention are homopolystyrene and rubber-reinforced polystyrene.

The weight average molecular weight of the polystyrene resin used in the present invention is preferably more than 30,000, more preferably more than 50,000.

Use of a polystyrene resin having such a molecular weight contributes to the excellent heat resistance, mechanical strength, flowability, and dimensional stability of the composition.

Polyolefin resin (C)

The polyolefin resin used in the present invention is a homopolymer or copolymer having more than 50% by weight of alpha-olefin such as ethylene, propylene, 1-butene, 4-methyl-1-pentene, etc. Examples of polyolefin resins include polyethylene resin, polypropylene resin, and ethylene-propylene copolymer, with polypropylene resin being preferred.

The polypropylene resin is a crystalline polymer obtained by carrying out polymerization using propylene monomer as the main component. Other than propylene, a block copolymer or random copolymer of alpha-olefin other than ethylene etc. can be used. In the case of the copolymer formed with ethylene, the content of structural units derived from ethylene is preferably within the range from 1 to 10% by weight. Suitable polypropylene resins may have a melt flow rate within the range from 0.01 to 100 g/10 min (MFR, JIS K7210, load 2.16 kg, 230° C.). Moreover, as regards the polypropylene resin, propylene random copolymer (called PPDM hereafter) containing non-conjugated diene co-monomer etc. can also be used.

The weight average molecular weight of the polyolefin resin used in the present invention is preferably greater than 20,000, more preferably greater than 30,000. Also, the MFR when measured at 230° C. with the load of 2.16 kg is preferably within the range from 0.1 to 100 g/10 min, more preferably within the range from 0.2 to 80 g/10 min.

Use of a polyolefin resin having such a molecular weight distribution contributes to the excellent mechanical strength, flowability, and solvent resistance of the composition.

Compatibility reagent (D)

The compatibility reagent is the material that has the ability to make polyphenylene ether resin (A), polystyrene resin (B), and polyolefin resin (C) compatible, and in the present invention, a hydrogenated styrene.diene block copolymer is suitable.

This hydrogenated styrene.diene block copolymer is an elastomeric block copolymer of a vinyl aromatic compound represented by styrene and conjugated diene, and it is the copolymer in which a part or entire part of conjugated diene block is hydrogenated (hydrogen added). Conjugated dienes suitable for forming the block copolymer include butadiene, isoprene, chloroprene, etc.

Regarding the manufacturing method of the hydrogenated styrene.diene block copolymer, the method may be used in which lithium catalyst or Ziegler type catalyst is used, and vinyl aromatic compound and conjugated diene are successively polymerized in an inert solvent, and the molecule is bonded by carrying out a coupling reaction, as needed. After carrying out the polymerization the polymer is hydrogenated. The hydrogen addition ratio should be at least 50% of the conjugated diene soft block. Preferably it should be more than 80%. Moreover, the hydrogen addition can be less than 25% of the aromatic unsaturated bond present in the styrene group hard block.

It is preferred to use a hydrogenated styrene.diene block copolymer having a content of structural units derived from styrene (styrene content) greater than 60% by weight, more preferably greater than 65% by weight. Hydrogenated styrene.diene block copolymers are known, for example, as the hydrogenated styrene-butadiene-styrene tri block copolymer (SEBS) sold as TUFTEC H1043 by Asahi Kasai. The hydrogenated styrene.diene block copolymer may have a number-average molecular weight within the range from 10,000 to 1,000,000, preferably within the range from 20,000 to 300,000. The number-average molecular weight of the hard block formed from styrene structural units present in the block copolymer may be within the range from 1,000 to 200,000, preferably within the range from 2,000 to 100,000. The number-average molecular weight of the conjugated diene soft block may be within the range from 1,000 to 200,000, preferably within the range from 2,000 to 100,000.

Impact Modifier (E)

The impact modifier (E) is the material that is added in order to improve the impact resistance of the obtained molded composition, Impact modifiers include, for example, styrene group rubber form polymers such as butadiene-styrene copolymer or its hydrogenation product, styrene isoprene copolymer or its hydrogenation product, styrene-butylene copolymer, styrene-ethylene-propylene copolymer, ethylene-propylene-styrene copolymer, etc.; ethylene-alpha-olefin rubber form polymers such as ethylene-propylene copolymer, ethylene-butene copolymer, ethylene-propylene-conjugated diene copolymer, etc.; natural rubber, butadiene polymer, isoprene polymer, chloro butadiene polymer, butadiene.acrylonitrile copolymer, isobutylene copolymer, isobutylene-butadiene copolymer, isobutylene-isoprene copolymer, perfluoro rubber, fluorine rubber, chloroprene rubber, butyl rubber, silicone rubber, thiokol rubber, multi sulfurized rubber, polyurethane rubber, polyether rubber, epichlorohydrin rubber, polyester elastomer, polyamide elastomer, etc.

Among these examples of styrene rubber form polymers, it may be preferred to use butadiene-styrene copolymer or its hydrogenation product, styrene-isoprene copolymer or its hydrogenation product, styrene-butylene copolymer, styrene-ethylene-propylene copolymer, ethylene-propylene-styrene copolymer, etc.; as well as ethylene-alpha-olefin rubber form polymers such as ethylene-propylene copolymer, ethylene-butene copolymer, ethylene-propylene-conjugated diene copolymer, etc.

A highly preferred styrene rubber form polymer is the elastomeric random copolymer or block copolymer of vinyl aromatic compound represented by styrene and conjugated diene. As regards the impact modifier, a block copolymer divided into styrene hard block and diene soft block is generally desired due to its high rubber elasticity. Examples of the styrene block copolymer rubber include block copolymers comprising a styrene block (S) and a butadiene block (B) (for example, linear block type such as SB, SBS, SBSBS, etc., as well as radial block type copolymers). Also, rubber modified by a functional monomer containing a functional radical such as carboxylic acid, epoxy, etc. can also be used. Moreover, in the case of using a hydrogenated material as the styrene rubber polymer, it is preferred to use a hydrogenated styrene.diene block copolymer having a styrene content of less than 60% by weight.

Many manufacturing methods have been proposed for the styrene block copolymer rubber, including, for example, that described in Japanese Patent Publication No. Sho 40-2798. In this method, lithium catalyst or Ziegler type catalyst is used and vinyl aromatic compound and conjugated diene are successively polymerized in an inert solvent and molecule is bonded by carrying out a coupling reaction after succession polymerization as needed.

Commercially available examples of the styrene block copolymer rubber being used in the present invention as impact modifier include, for example, KRATON D1101 (Shell Kabushiki Kaisha), and CARIFLEX (America Shell Chemical Kabushiki Kaisha).

The styrene block copolymer rubber may have a number-average molecular weight within the range from 10,000 to 1,000,000, preferably within the range from 20,000 to 300,000. The number-average molecular weight of the vinyl aromatic hard block present in the block copolymer rubber may be within the range from 1,000 to 200,000, preferably within the range from 2,000 to 100,000. The number-average molecular weight of the conjugated diene soft block may be within the range from 1,000 to 200,000, preferably within the range from 2,000 to 100,000. The weight ratio of vinyl aromatic hard block/conjugated diene soft block may be within the range from 2/98 to 60/40, preferably within the range from 10/90 to 40/60.

When an ethylene-alpha-olefin rubber copolymer is used as the impact modifier, it may preferably have an ethylene content within the range from 30 to 93 mole %, more preferably within the range from 35 to 90 mole %. Such an ethylene content contributes to the excellent impact resistance of the composition. Moreover, if the ethylene content of the ethylene-alpha-olefin rubber copolymer mentioned above becomes more than 93 mole % or less than 30 mole %, then the ethylene-alpha-olefin rubber copolymer mentioned above becomes highly crystalline and its effect as an impact modifier is insufficient.

Also, the melt flow rate [MFR, value measured at 190° C. with the load of 2160 g (ASTM D-1238 condition)] of the ethylene-alpha-olefin rubber copolymer mentioned above at 190° C. is preferably within the range from 0.1 to 80 g/10 min, more preferably within the range from 0.2 to 50 g/10 min. If the MFR of the ethylene-alpha-olefin rubber copolymer mentioned above is within this range, then its impact modifying effect may be insufficient.

Also, the density of the ethylene-alpha-olefin rubber copolymer mentioned above is preferably less than 0.90 g/cm$^3$, more preferably within the range from 0.85 to 0.89 g/cm$^3$. Furthermore, the ethylene-alpha-olefin rubber copolymer mentioned above is preferably low crystalline or non-crystalline, and its crystallization density is preferably within the range from 0 to 50%, more preferably within the range from 0 to 40%.

The alpha-olefin component of the ethylene-alpha-olefin rubber copolymer mentioned above has 3 to 18 carbon atoms, and examples include propylene, 1-butene, 1-hexene, 4-methyl-1-heptene, 1-decene, etc. These can be used independently or by mixing two or more than two types. The ethylene-alpha-olefin rubber copolymer mentioned above is usually the copolymer of ethylene component and alpha-olefin, however, it can contain a diene component in a quantity of less than 5 mole %. Concrete examples of the diene component include dicyclopentadiene, ethylidene norbornene, etc.

Composition of the composite

The resin composition being used in the present invention contains (A) to (C) mentioned above in a composition of
(A) 1 to 98 parts by weight of a polyphenylene ether resin;
(B) 1 to 99 parts by weight of a polystyrene resin; and
(C) 1 to 99 parts by weight of a polyolefin resin;
wherein the total of (A) to (C) mentioned above is 100 parts by weight.

Thus, in the present invention, the composition may be formed containing all the components such as polyphenylene ether resin (A), polystyrene resin (B), and polyolefin resin (C), due to which the pipe covering has high chemical resistance, heat resistance, weatherability, strength, flame retardance, and excellent corrosion resistance. Moreover, using the composition containing components (A) to (C) mentioned above has been used, an adhesive layer is not required, thereby simplifying the process and reducing its price.

Also, with the proviso that the total of (A) to (C) is 100 parts by weight, (A) is preferably present in a quantity within the range from 1 to 98 parts by weight, more preferably within the range from 3 to 94 parts by weight, and even more preferably within the range from 5 to 90 parts by weight; (B) is preferably present in a quantity within the range from 1 to 98 parts by weight, more preferably within the range from 3 to 94 parts by weight, and even more preferably within the range from 5 to 90 parts by weight; and (C) is preferably present in a quantity within the range from 1 to 98 parts by weight, more preferably within the range from 3 to 94 parts by weight, and even more preferably within the range from 5 to 90 parts by weight. If the quantity of polyphenylene ether resin (A) becomes less than the range mentioned above, heat resistance becomes insufficient, whereas if it becomes more than that, then melt flow is impaired. Also, if the quantity of polystyrene resin (B) becomes more than the range mentioned above, then melt flow is reduced, whereas if it becomes more than that, then heat resistance is reduced. Furthermore, if the quantity of polyolefin resin (C) becomes less than the range mentioned above, then solvent resistance and melt flow are impaired, whereas if it becomes more than that, then mechanical strength and heat resistance are reduced.

The quantity of polystyrene resin (B) is preferably more than 10% by weight with respect to the total of polyphenylene ether resin (A) and polystyrene resin (B), more preferably within the range from 10 to 90% by weight. Particularly, if the polystyrene resin is contained in the quantity in the range mentioned above with respect to polyphenylene ether resin, then the composition exhibits an excellent balance of mechanical strength, heat resistance, and melt flow.

Also, the compatibility reagent (D) is preferably contained in a quantity within the range from 0.1 to 100 parts by weight with respect to the total of 100 parts by weight of the components (A) to (C) mentioned above, more preferably in a quantity within the range from 0.2 to 50 parts by weight. If it is contained in a quantity within the range mentioned above, then the components (A) to (C) mentioned above can be mixed and dispersed in the composition homogeneously, due to which the covering layer exhibits excellent mechanical properties.

The impact modifier (E) is optionally employed in the composition. It is preferably used in a quantity within the range from 0 to 100 parts by weight with respect to the total of 100 parts by weight of the components (A) to (C) mentioned above, more preferably in a quantity within the range from 1 to 50 parts by weight. If it is contained in the quantity within the range mentioned above, then the covering layer exhibits excellent impact resistance.

Other high molecular weight compounds and different additives may, optionally, be compounded other than the components (A) to (E) mentioned above, as long as they do not detract from the properties of the composition.

Such other high molecular weight compounds include, for example, copolymers of an alpha-olefin and a vinyl monomer copolymerizable with it (for example, acrylic acid esters, methacrylic acid esters, vinyl acetate, styrene, acrylonitrile, glycidyl (meth)acrylate, etc.); adduct polymer type high molecular weight compounds such as poly (vinyl chloride), poly (ethyl methacrylate), poly (vinyl acetate), poly (vinyl pyridine), poly (vinyl carbazole), polyacrylamide, polyacrylonitrile, etc.; condensation type high molecular weight compounds such as polycarbonate, polystyrene, polyether sulfone, polyethylene terephthalate, polybutylene terephthalate, polyallylene ester, polyphenylene sulfide, polyamide, polyacetal, etc.; different thermal hardening type resins such as silicone resin, fluorine resin, polyimide, polyamide imide; as well as phenol resin, alkyd resin, unsaturated polyester resin, di allyl phthalate resin, etc. The compounding quantity of these other high molecular compounds is preferably less than 500 parts by weight with respect to the total of 100 parts by weight of the components (A) to (C), more preferably less than 100 parts by weight.

Moreover, a filler may, optionally, also be compounded with the resin composition used in the present invention with the aim of imparting strength and functionality, etc. Suitable fillers include glass fiber, carbon fiber, aramid fiber, metal fibers such as aluminum and stainless steel, etc., as well as whisker-type fibers; as well as inorganic fillers such as silica, alumina, calcium carbonate, talc, mica, clay, kaolin, magnesium sulfate, carbon black, $TiO_2$, ZnO, $Sb_2O_3$, etc. The compounding quantity of these fillers is preferably less than 100 parts by weight with respect to the total of 100 parts by weight of the components (A) to (C), more preferably less than 50 parts by weight.

Suitable additives include flame retardants such as halogenated flame retardants, phosphate flame retardants, etc.; flame retardant synergists such as $Sb_2O_3$ etc.; lubricants such as mineral oil, etc.; plasticizers such as phthalic acid esters, etc.; as well as dyes, pigments, antistatic reagents, antioxidants, weatherability reagents, etc. There is no particular restriction on the quantity of these additives as long as it does not interfere with melt flow and kneadability of the resin composition.

Preparation of resin composition

There is no particular restriction on the method that is used to manufacture the resin composition, and usual methods can be satisfactorily used, however, the common melt mixing method may be used. Moreover, solvent can also be used in a small quantity, however, it is generally not required. Examples of suitable mixing equipment include extruders, Banbury mixers, rollers, kneaders, etc., and these can be operated in batch or continuous mode. Also, there is no particular restriction over the order of mixing of the components.

For example, in the case of carrying out melt kneading using an extruder or the like, either all the components can be compounded and kneaded, or multiple feed ports can be set up in one extrusion machine with orderly feeding of more than one type of component. The resin composition obtained by carrying out melt kneading can be directly used as is for covering the pipe of the present invention, or it may first be cooled and solidified to make pellets, powder, etc., and then additives may once again be added as needed before it is melt kneaded again.

Covering of pipe

Covering of the pipe with the resin composition mentioned above can be carried out by using any desired covering method previously used for resin covering of steel material.

Moreover, as regards the pipe, pipe used for tap water, pipe used for gas, etc., can be used, and it may be a straight pipe or include pipe coupling. The pipe of the present invention can be made formed from steel material or concrete, as well as from resins such as poly (vinyl chloride), etc.

The pipe to be covered can be pre-treated as per common methods. For example, in the case of steel material, pre-treatments may include fat removing, acid washing, shot blast, etc., carried out for surface cleaning; chromate treatment or phosphoric acid salt treatment, etc. carried out for improving the corrosion resistance; and combinations thereof.

Also, regarding the adhesion characteristic of the resin composition, an adhesive layer can be interposed between the covering layer and pipe part material in order to increase adhesion strength, as needed. This adhesive layer may be formed by coating, for example, epoxy resin primer on the surface of the pipe part material, then backing and drying it. Also, an adhesive thermoplastic resin such as a thin film of polyethylene modified by an organic acid such as maleic acid, fumaric acid, etc., or an organic acid anhydride may be covered on the pipe beforehand as the adhesive layer.

Methods used for covering the pipe with the resin composition mentioned above include (i) a film covering method in which the resin composition is molded into film form by melting it and then carrying out extrusion molding, and after this, covering the pipe part material by this film, (ii) an extrusion covering method in which the melted resin composition obtained from the extruder is extruded into film form, and then it is covered on the surface of the pipe part material such as steel pipe etc., (iii) an injection molding method in which a contact covering layer is formed by injection molding (insert molding of pipe part material), (iv) a flow dipping method in which the pre-heated pipe part material is dipped into the flow layer made into the flow state by carrying out air shooting on powder form resin composition and then, covering the resin composition, (v) a spray covering method in which a powdered resin composition is sprayed on the pre-heated pipe part material by using an electrostatic powder gun, (vi) a coating method in which the resin composition is dissolved in a non-aqueous solvent in which it soluble and the surface coat is coated and covered, etc. For covering of pipe having small diameter, it may be preferred to use the film covering method, extrusion covering method, injection molding method, or the flow dipping method. In case of the extrusion covering method, any styles such as circular style or T style can be used, however, generally, circular style is preferred for small-sized pipe part material such as pipe having small diameter, etc., and T style is appropriate to be used in case of large-sized pipe part material such as pipe having a large diameter.

Among the covering methods described above, covering may preferably use a film formed from the resin composition or and injection molded product of the resin composition.

There is no particular restriction over the position of the covering on the pipe. In particular, the entire surface of the pipe part material is not necessarily required to be covered with the PPE resin composition, and at least a part of the surface can be covered. For example, in the case of straight pipe, the external surface is generally covered with the PPE resin composition. The internal surface can be untreated, treated with other than the resin coating, or covered with the resin composition.

There is no particular restriction on the thickness of the covering layer as long as the thickness that does not get damaged easily. Generally, thicknesses are within the range from 0.05 to 20 mm, preferably within the range from 0.1 to 10 mm.

There is no particular restriction on the use of the corrosion-resistant pipe of the present invention. However, since it has excellent corrosion-resistance, weatherability, flame retardance, impact resistance, and strength, it can be used in different environments. A preferred use of the corrosion-resistant pipe is as a gas pipe having a small diameter. Namely, the gas pipe having a small diameter can be used underground, indoors or outdoors as the underground service pipe of a house or building, as an overhead pipe, or as an indoor pipe. The corrosion-resistant pipe may be used in places that previously employed polyethylene covered steel pipes, zinc plated steel pipes, and salt covered steel pipes. Replacement of these various older types of pipes with the corrosion-resistant pipe of the present invention is advantageous from manufacturing and economic points of view.

The corrosion-resistant pipe of the invention exhibits high heat resistance, excellent flame retardance, corrosion resistance, chemical resistance, insulation properties, and sufficiently high adhesion to the steel pipe. It also is economical to produce and use.

The corrosion-resistant pipe has remarkably high corrosion resistance due to high adhesion strength between the protective layer and the steel pipe, and the high corrosion resistance can be exhibited in any environment such as underground, outdoors, or indoors.

The present invention has been explained below in further detail with the help of practical examples. However, the present invention is not restricted only to these practical examples.

PRACTICAL EXAMPLES 1–3, COMPARATIVE EXAMPLES 1–4

Component (A): Polyphenylene ether resin (PPE)

Poly (2,6-dimethyl-1,4-phenylene ether) (Nippon GE Plastics Kabushiki Kaisha) having an intrinsic viscosity of 0.46 dl/g.

Component (B): Polystyrene resin

Polystyrene resin (Dainippon Ink Kagaku Kabushiki Kaisha) having a melt flow rate (MFR) of 8 g/10 min at 200° C. and a load of 5 kg.

Component (C): Polyolefin resin (C-1) Homopolypropylene resin (homo PP) (Grand Polypro Kabushiki Kaisha product no. J106) having an MFR of 15 g/10 min at 230° C. and a load of 2.16 kg.

(C-2) Block polypropylene resin (block PP) (Grand Polypro Kabushiki Kaisha, product no. J708) having an MFR of 45 g/10 min at 230° C. and a load of 2.16 kg.

Component (D): Compatibility reagent

Hydrogenated styrene-butadiene-styrene block copolymer having a styrene content of 67% of the total copolymer (SEBS) (Asahi Kasei Kabushiki Kaisha, product no. TUFTEC H1043)

Component (E): Impact Modifier (E-1) Styrene-butadiene-styrene block copolymer having styrene content of 31% of the total copolymer (SBS) (Shell Kabushiki Kaisha, product no. KRATON D1101)

(E-2) Ethylene-butene copolymer (EBM) (Exxon Kabushiki Kaisha, product no. EXACT 4033) having an MFR of 0.8 g/10 min at 190° C. and a load of 2.16 kg.

Preparation of composition

All of the materials mentioned above were used and the compositions given in Table 1 were extruded using a twin-screw extruder at 200 rpm and a barrel set temperature between 270 and 280° C.; pellets were prepared by cutting.

The pellets thus prepared were used and test plates were molded using an 80 t injection molding machine made by Toyo Kikai Kinzoku Kabushiki Kaisha. The molding conditions were set at a barrel temperature of 260° C. and a metallic mold temperature of 60° C. Mechanical properties such as Izod impact strength, tensile strength, etc. were evaluated as per ASTM standard.

Chemical resistance characteristic test

The ASTM-1 test plates obtained by injection molding of each sample were fixed to the condition of warp being set to 1% using the warp tool and rust prevention reagent and cutting oil were coated on their surface. Go Kogyo Kabushiki Kaisha product no. CRC5-56 was used as the rust prevention reagent and Yushiro Kagaku Kabushiki Kaisha product no. Silocat UB75 was used as the cutting oil. Samples were kept undisturbed at room temperature as well as at 65° C. for 72 hours after which the presence of generation of cracks on the surface of the test material was visually observed.

The results have been presented in Table 1 given below.

Evaluation of pipe

Resin covering was carried out on the pipe coupling using pipes having a diameter of 1.5 inch by insert molding method using the composition mentioned above and drop test and chemical resistance characteristic test (rust prevention reagent and cutting oil) were performed using the resulting resin covered pipes.

In Practical Examples 1 to 3, no warps of the resin covering were observed in any of the tests, and covering of the pipe was maintained. On the other hand, in the Comparative Example 1, warps formed in the chemical resistance characteristic test, and also, in the Comparative Examples 2, 3 and 4, the resin covering formed warps in the drop test and it did not maintain its covering of the pipe.

TABLE 1

|  |  |  |  |  | Practical example 1 | Practical example 2 | Practical example 3 |
|---|---|---|---|---|---|---|---|
| Composition | A-1: PPE |  |  |  | 45 | 30 | 15 |
|  | B-1: PS |  |  |  | 18 | 20 | 20 |
|  | C-1: PP homo |  |  |  | 20 | 40 |  |
|  | C-2: PP block |  |  |  |  |  | 45 |
|  | D-1: SEBS |  |  |  | 10 | 5 | 10 |
|  | E-1: SUBSTANCE |  |  |  | 7 |  |  |
|  | E-2: EBR |  |  |  |  | 5 | 10 |
| Composition characteristics | Izod impact strength | ASTM D | Kg.cm/cm |  | 25 | 8 | 40 |
|  | Tensile strength | ASTM D | Kg/cm$^2$ |  | 480 | 440 | 360 |
| Pipe | Chemical resistance characteristic | Rust prevention reagent |  |  | OK | OK | OK |
|  |  | Cutting oil |  |  | OK | OK | OK |

|  |  |  |  |  | Comparative example 1 | Comparative example 2 | Comparative example 3 | Comparative example 4 |
|---|---|---|---|---|---|---|---|---|
| Composition | A-1: PPE |  |  |  | 45 |  |  | 30 |
|  | B-1: PS |  |  |  | 55 |  |  | 25 |
|  | C-1: PP homo |  |  |  |  | 100 |  | 45 |
|  | C-2: PP block |  |  |  |  |  | 100 |  |
|  | D-1: SEBS |  |  |  |  |  |  |  |
|  | E-1: SBS |  |  |  |  |  |  |  |
|  | E-2: EBR |  |  |  |  |  |  |  |
| Composition characteristics | Izod impact strength | ASTM D | Kg.cm/cm |  | 18 | 2 | 7 | 2 |
|  | Tensile strength | ASTM D | Kg/cm$^2$ |  | 630 | 370 | 250 | 470 |
| Pipe | Chemical resistance characteristic | Rust prevention reagent |  |  | NG | OK | OK | OK |
|  |  | Cutting oil |  |  | NG | OK | OK | OK |

As is clear from the table given above, the corrosion-resistant pipe of the present invention has excellent chemical resistance and, moreover, has excellent impact resistance and tensile strength.

In summary, the present invention provides a resin-covered, corrosion-resistant pipe having high heat resistance, and excellent flame retardance, corrosion resistance, chemical resistance, and insulation properties, as well as sufficiently high adhesion between the protective resin layer and excellent economic characteristics.

What is claimed is:

1. A corrosion-resistant pipe, comprising:

a pipe; and a protective layer covering a surface of the pipe, the protective layer comprising
(A) 1 to 98 parts by weight of a polyphenylene ether resin;
(B) 1 to 98 parts by weight of a polystyrene resin;
(C) 1 to 98 parts by weight of a polyolefin resin; wherein the total of (A), (B), and (C) is 100 parts by weight; and
(D) 0.1 to 100 parts by weight of a compatibility reagent per 100 total parts by weight of (A), (B), and (C); wherein the compatibility reagent is a hydrogenated styrene-diene block copolymer having a styrene content greater than 65% by weight.

2. The corrosion-resistant pipe of claim 1, wherein the polyphenylene ether resin is poly(2, 6-dimethyl-1,4-phenylene ether) or a copolymer comprising 2,3,6-trimethyl-1,4-phenylene ether units.

3. The corrosion-resistant pipe of claim 1, wherein the polystyrene resin amount is at least 10% by weight of the total of the polyphenylene ether resin amount and the polystyrene resin amount.

4. The corrosion-resistant pipe of claim 1, wherein the polyolefin resin is polypropylene.

5. The corrosion-resistant pipe of claim 1, wherein the protective layer further comprises (E) 1 to 50 parts by weight of an impart modifier per 100 parts by weight total of (A), (B), and (C).

6. The corrosion-resistant pipe of claim 5, wherein the impact modifier (E) is selected from the group consisting of styrene-butadiene block copolymers, hydrogenated styrene-butadiene block copolymers, styrene-isoprene block copolymers, hydrogenated styrene-isoprene block copolymers, and ethylene-alpha-olefin rubber copolymers.

7. The corrosion-resistant pipe of claim 1, wherein the protective layer is applied as a film.

8. The corrosion-resistant pipe of claim 1, wherein the protective layer is formed by injection molding.

9. The corrosion-resistant pipe of claim 1, wherein the protective layer has a thickness of 0.05 to 20 millimeters.

10. The corrosion-resistant pipe of claim 1, wherein the pipe comprises steel, concrete, or poly(vinyl chloride).

11. The corrosion-resistant pipe of claim 1, wherein the pipe comprises steel.

12. The corrosion-resistant pipe of claim 1, further comprising an adhesive layer interposed between the pipe and the protective layer.

13. The corrosion-resistant pipe of claim 1, comprising 40 to 98 parts by weight of the polyolefin resin.

14. A corrosion-resistant pipe, comprising:

a steel pipe; and a protective layer covering a surface of the pipe, the protective layer comprising
(A) 5 to 90 parts by weight of a polyphenylene ether resin;
(B) 5 to 90 parts by weight of a polystyrene resin;
(C) 5 to 90 parts by weight of a polyolefin resin; wherein the total of (A), (B), and (C) is 100 parts by weight;
(D)) 0.2 to 50 parts by weight of a compatibility reagent per 100 total parts by weight of (A), (B), and (C); wherein the compatibility reagent is a hydrogenated styrene-diene block copolymer having a styrene content greater than 65% by weight; and
(E) 1 to 50 parts by weight of an impact modifier per 100 total parts by weight of (A), (B), and (C).

15. A method of protecting a pipe from corrosion, comprising:

covering a surface of the pipe with a protective layer comprising
(A) 1 to 98 parts by weight of a polyphenylene ether resin;
(B) 1 to 98 parts by weight of a polystyrene resin;
(C) 1 to 98 parts by weight of a polyolefin resin; wherein the total of(A), (B), and (C) is 100 parts by weight; and
(D)) 0.1 to 100 parts by weight of a compatibility reagent per 100 total parts by weight of (A), (B), and (C); wherein the compatibility reagent is a hydrogenated styrene-diene block copolymer having a styrene content greater than 65% by weight.

* * * * *